United States Patent
Stevens

(10) Patent No.: US 7,424,986 B2
(45) Date of Patent: Sep. 16, 2008

(54) BELT SPOOL RETRACTOR

(75) Inventor: Bruce A. Stevens, Oakland, MI (US)

(73) Assignee: Automotive Systems Laboratory, Inc., Armada, MI (US)

(*) Notice: Subject to any disclaimer, the term of this patent is extended or adjusted under 35 U.S.C. 154(b) by 453 days.

(21) Appl. No.: 11/054,793

(22) Filed: Feb. 9, 2005

(65) Prior Publication Data

US 2005/0173581 A1 Aug. 11, 2005

Related U.S. Application Data

(60) Provisional application No. 60/543,256, filed on Feb. 10, 2004.

(51) Int. Cl.
*B65H 75/48* (2006.01)
*B60R 22/46* (2006.01)

(52) U.S. Cl. .................. 242/374; 280/807; 297/475

(58) Field of Classification Search .............. 242/374; 280/807; 297/475
See application file for complete search history.

(56) References Cited

U.S. PATENT DOCUMENTS

| | | | |
|---|---|---|---|
| 3,219,288 A * | 11/1965 | Fritz | 242/370 |
| 4,422,366 A | 12/1983 | Weyer | |
| 4,597,546 A | 7/1986 | Yamamoto et al. | |
| 4,745,847 A | 5/1988 | Voss | |
| 5,035,757 A | 7/1991 | Poole | |
| 5,460,668 A | 10/1995 | Lyon | |
| 5,553,803 A | 9/1996 | Mitzkus et al. | |
| 5,667,161 A | 9/1997 | Mitzkus et al. | |
| 5,743,480 A | 4/1998 | Kopetzky et al. | |
| 5,756,929 A | 5/1998 | Lundstrom et al. | |
| 5,782,423 A * | 7/1998 | Miller et al. | 242/374 |
| 5,806,888 A | 9/1998 | Adamini | |
| 5,839,686 A * | 11/1998 | Dybro et al. | 242/374 |
| 5,872,329 A | 2/1999 | Burns et al. | |
| 5,924,640 A * | 7/1999 | Hickey | 242/374 |
| 5,984,223 A | 11/1999 | Hiramatsu | 242/379.1 |
| 5,984,233 A * | 11/1999 | Snyder et al. | 244/119 |
| 6,009,809 A | 1/2000 | Whang | |

(Continued)

OTHER PUBLICATIONS

Office Action U.S. Appl. No. 11/039,526, filed Jan. 19, 2005 dated for Jun. 19, 2007.
Office Action U.S. Appl. No. 11/039,526, filed Jan. 19, 2005 dated for Dec. 12, 2007.

Primary Examiner—Peter M. Cuomo
Assistant Examiner—Stefan Kruer
(74) Attorney, Agent, or Firm—L.C. Begin & Associates, PLLC

(57) ABSTRACT

A seatbelt pretensioner mechanism (10) for use with a seatbelt retractor (11). The retractor (11) has a spool (16) configured for winding a seatbelt webbing thereon. The pretensioner mechanism (10) includes a movable actuator member (22) slidably coupled to the spool (16), a stationary member (20) secured to the retractor (11), and a base member (50) slidably coupled to the actuator (22) and to the stationary member (20). Helical splines (23) extend along a portion of the spool (16), and one or more complementary pins (25) extend along a first portion of the movable member (22) for slidingly engaging the splines (23) on the spool (16). Pins (28) also extend along a second portion of the movable member (22), and complementary helical splines (29) extend along a portion of the base member (50) for slidingly engaging the pins (28) on the second portion of the movable member (22).

21 Claims, 3 Drawing Sheets

U.S. PATENT DOCUMENTS

| | | | |
|---|---|---|---|
| 6,105,893 A * | 8/2000 | Schmidt et al. ............. 242/374 |
| 6,341,799 B1 | 1/2002 | Furusawa et al. |
| 6,349,628 B1 | 2/2002 | Heineken |
| 6,419,177 B2 | 7/2002 | Stevens |
| 6,505,790 B2 | 1/2003 | Stevens |
| 6,752,421 B2 | 6/2004 | Khandhadia et al. |

* cited by examiner

BELT SPOOL RETRACTOR

CROSS REFERENCE TO RELATED APPLICATIONS

This application claims the benefit of provisional application Ser. No. 60/543,256, filed on Feb. 10, 2004.

BACKGROUND OF THE INVENTION

The present invention relates to seatbelt systems and, more particularly, to a pretensioner for a seatbelt system.

Seatbelt pretensioners remove slack from a safety belt in the event of a collision in order to minimize forward movement of the passenger. Many existing pretensioner designs are used in conjunction with a conventional seatbelt retractor, and utilize a clutch assembly for coupling the pretensioner to the retractor in the event of a collision, to enable pretensioning of the seatbelt. However, such clutch assemblies add to the expense and complexity of the seatbelt system. Clutch assemblies also add to the space occupied by the seatbelt system.

SUMMARY OF THE INVENTION

The present invention provides a pretensioner mechanism for use with a seatbelt retractor. The pretensioner mechanism includes a rotatable member configured for rotating in a first direction to wind a seatbelt webbing thereon, and a movable member movable with respect to the rotatable member. First and second complementary motion transmission elements are provided, the first motion transmission element being secured along a portion of the movable member and the second motion transmission element being secured along a portion of the rotatable member, the second motion transmission element being configured for sliding engagement with the first motion transmission element. A base member is also provided which is movable with respect to the movable member. In addition, complementary third and fourth motion transmission elements are provided, the third motion transmission element being secured along a portion of the base member and the fourth motion transmission element being secured along a portion of the movable member, the fourth motion transmission element being configured for sliding engagement with the third motion transmission element.

At least one of the motion transmission elements has a helical configuration for producing relative rotation between the at least one motion transmission element and a complementary motion transmission element thereof upon sliding engagement therebetween. The pretensioner mechanism also includes an engageable coupling mechanism for coupling the base member to a portion of the pretensioner mechanism that is substantially fixed with respect to the rotatable member, to substantially rotationally constrain the base member so as to substantially prevent rotation of the base member in a second direction opposite the first direction during sliding engagement between the third and fourth motion transmission elements.

The present invention provides advantages over known pretensioner designs, which typically utilize a pretensioning mechanism situated outside of the retractor frame. By locating the majority of the pretensioning mechanism inside the retractor spool, the size of the pretensioner/retractor assembly can be reduced compared to known designs. In addition, in the design disclosed herein, a clutch assembly is not required to couple the pretensioner to the retractor spool.

BRIEF DESCRIPTION OF THE DRAWINGS

FIG. 2a is an end view of a load-limiting mechanism incorporated into the present invention;

DETAILED DESCRIPTION

Figure 1:
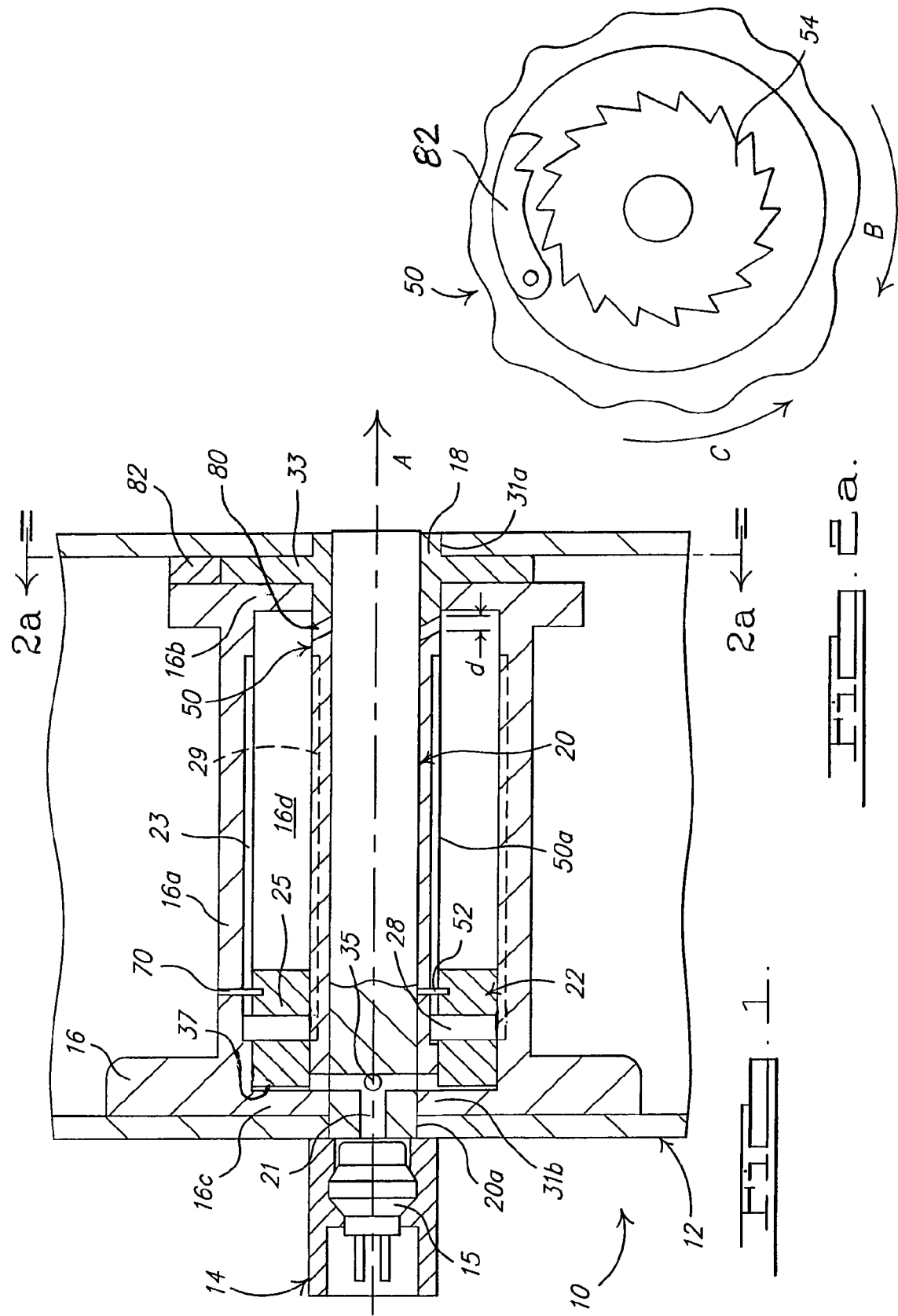
FIG. 1 is a cross-sectional side view of a first embodiment of a pretensioner mechanism in accordance with the present invention, prior to activation.

Referring to FIG. 1, there is illustrated a pretensioner mechanism 10 in accordance with a first embodiment of the present invention. Pretensioner mechanism 10 is designed for use with (or incorporation into) a conventional seatbelt retractor (not shown) having a retractor frame 12 adapted to mount in a vehicle, and for use with a spool 16 rotatably secured within frame 12, around which conventional seatbelt webbing (not shown) may be wrapped. All the component parts of pretensioner mechanism 10 are manufactured from known materials and by known processes.

Pretensioner mechanism 10 includes a movable actuator member 22 slidably coupled to spool 16, a stationary member 20 secured to the retractor along a path of slidable movement of actuator 22, and a base member 50 slidably coupled to actuator 22 and to stationary member 20.

Spool 16 has an end of the seatbelt secured thereto and preferably rotates freely relative to retractor frame 12 at two bearing points 31a and 31b, allowing the seatbelt to be alternately wrapped and unwrapped as needed. In the first embodiment, bearing point 31a comprises a cylindrical extension 18 on spool 16 that rotates in an aperture formed in retractor frame 12. Bearing point 31b comprises a portion of spool 16 that rotates about stationary member 20, which is fixed relative to retractor frame 12. Spool 16 has a substantially cylindrical sidewall 16a and a pair of opposed endwalls 16b, 16c. Sidewall 16a and endwalls 16b, 16c define an interior cavity 16d of the spool. Spool 16 may be formed from steel, aluminum, metal alloys, plastic, and/or other known materials.

Referring again to FIG. 1, actuator 22 is provided for producing rotation of spool 16 upon activation of the pretensioner mechanism, in a manner described in greater detail below. In the first embodiment, actuator 22 includes one or more pressure surfaces 37 along a face of the actuator residing opposite spool endwall 16c. Actuator 22 is slidably received within spool interior cavity 16d and is preferably substantially cylindrical and substantially coaxial with spool 16. Actuator 22 may be formed from steel, aluminum, metal alloys, plastic, and/or other known materials. In the first embodiment, actuator 22 also includes one or more pins 25 projecting from exterior surfaces of the actuator for engaging complementary features formed along an interior surface of spool sidewall 16a, to rotate spool 16 in a manner described in greater detail below.

Actuator 22 is designed to rotate in conjunction with spool 16 during normal operation of the seatbelt retractor. To this end, actuator 22 may be rotatably coupled to spool 16 using any one of a variety of known methods. Referring again to FIG. 1, in one example, actuator 22 is coupled to spool 16 by a shear pin 70 extending into both actuator 22 and spool 16. In a manner described in greater detail below, shear pin 70 is designed to shear apart under pressure exerted by inflation gases on actuator pressure surface 37 upon activation of the pretensioner, enabling actuator 22 to move in the direction indicated by arrow "A" in response to the inflation gas pressure, thereby slidably engaging both spool 16 and base member 50. Alternative methods may be used to rotatably couple actuator 22 to spool 16. However, any method used to couple actuator 22 to spool 16 should be disengageable to permit movement of actuator 22 in direction "A" upon activation of the pretensioner.

Referring again to FIG. 1, in the first embodiment of the pretensioner mechanism, stationary member 20 is secured to retractor frame 12 along a path of slidable movement of actuator 22. Stationary member 20 is fixed with respect to frame 12 (i.e., stationary member 20 does not rotate with respect to frame 12) and includes a longitudinal, cylindrical shaft portion 20a spanning frame 12, and a flange 33 extending outwardly from shaft portion 20a. Flange 33 has a plurality of teeth 190 formed thereon. Shaft portion 20a and flange 33 are substantially cylindrical and substantially coaxial with spool 16. A passage 21 extends through shaft portion 20a and a plurality of gas exit apertures 35 are formed along a part of shaft portion 20a residing between spool endwall 16c and actuator pressure surfaces 37, to enable fluid communication between a portion of spool interior cavity 16d and an igniter 15 described in further detail below. Actuator pressure surface 37 resides in the portion of spool interior cavity 16d in communication with igniter 15. Shaft portion 20a may be formed from steel, aluminum, metal alloys, plastic, and/or other known materials, using know processes, such as rollforming or extrusion. Flange 33 may be formed integral with shaft portion 20a, or the flange may be formed separately from shaft portion 20a and attached thereto using known methods. Flange 33 may be made from the same materials as shaft portion 20a by known processes, such as stamping, cutting, piercing, or injection molding.

Base member 50 is slidably mounted along stationary member 20 and is rotatable with respect to both actuator 22 and stationary member 20. Base member 50 can also move translationally with respect to both actuator 22 and stationary member 20, in the direction indicated by arrow "A". In addition, base member 50 is also movable in response to movement of actuator 22. Base member 50 includes a longitudinal, cylindrical shaft portion 50a substantially spanning frame 12.

Base member 50 is designed to rotate in conjunction with spool 16 during normal operation of the seatbelt retractor. To this end, base member 50 may be rotatably coupled to spool 16 using any one of a variety of known methods. Referring again to FIG. 1, in one example, base member 50 is coupled to spool 16 by a shear pin 52 extending into both base member 50 and actuator 22 (which is also rotatably coupled to spool 16 using shear pin 70, as previously described.) Shear pin 52 is designed to shear apart under pressure exerted by inflation gases on actuator pressure surface 37 upon activation of the pretensioner, enabling actuator 22 to move in the direction indicated by arrow "A" in response to the inflation gas pressure, thereby slidably engaging both spool 16 and base member 50. Alternative methods may be used to rotatably couple base member 50 to actuator 22. However, any method used to couple base member 50 to actuator 22 should be disengageable to permit movement of actuator 22 in direction "A" upon actuation of the pretensioner. Base member 50 may be formed from steel, aluminum, metal alloys, plastic, and/or other known materials.

The present invention provides an actuator which converts a translational, or sliding, motion of actuator 22 into a rotary motion of seatbelt retractor spool 16, for use in pretensioning the seatbelt. Conversion of the translational motion to rotational motion is effected by interposing a plurality of complementary engageable motion transmission elements between spool 16 and actuator 22, and by interposing another plurality of complementary engageable motion transmission elements between actuator 22 and base member 50.

Referring again to FIG. 1, in the first embodiment, the engageable motion transmission elements comprise one or more helical splines 23 extending along an interior surface of spool sidewall 16a, and one or more complementary pins 25 extending from an exterior surface of actuator 22. The engageable motion transmission elements also comprise one or more helical splines 29 extending along an exterior surface of base member 50, and one or more complementary pins 28 extending along another surface of actuator 22. Pins 25 are configured for sliding engagement with splines 23, and pins 28 are configured for sliding engagement with splines 29. It is noted that elements 25 and 28 may comprise opposite ends of the same pin, rather than different pins, extending from actuator 22.

Splines 23 along spool 16 and complementary pins 25 along actuator 22 are configured so that sliding engagement between splines 23 and pins 25 produces a rotation of splines 23 (and, thus, a corresponding rotation of spool 16) relative to pins 25. Similarly, pins 28 along actuator 22 and complementary splines 29 are configured so that sliding engagement between the pins 28 and splines 29 produces a rotation of pins 28 (and, thus, a corresponding rotation of actuator 22) relative to splines 29. Sliding engagement between the respective complementary spines and pins is provided by movement of actuator 22 in the direction indicated by arrow "A". As actuator 22 moves in the direction indicated by arrow "A", pins 28 along actuator 22 slidingly engage splines 29 along base member 50, thereby producing the desired relative rotational motion of actuator 22. Similarly, as actuator 22 moves along base member 50 in the direction indicated by arrow "A", pins 25 along actuator 22 slidingly engage splines 23 along spool 16, thereby producing the desired relative rotational motion of spool 16. The principles used herein are similar to those used in the construction and operation of helical rotary actuator devices manufactured, for example, by Helac Corporation of Enumclaw, Wash.

In a particular embodiment, motion transmission elements 23, 25, 28, and 29 are configured so that spool 16 will rotate approximately 1.25 revolutions upon activation of the pretensioner, thereby removing a length of slack from the seatbelt approximately equal to 1.25 times the circumference of the spool. Alternative embodiments are also contemplated wherein the motion transmission elements are configured to rotate spool 16 a greater number of revolutions or a fewer number of revolutions.

In alternative embodiments, one or more of groups of motion transmission elements 23, 25, 28, 29 described above may be replaced with other types of motion transmission elements designed to produce rotational motion upon complementary interengagement. For example, the helical splines may be replaced with appropriately positioned helical gear teeth (not shown) adapted for operative engagement with complementary helical splines, other helical gear teeth, or complementary non-helical elements.

In addition, either a first plurality 23, 25 or a second plurality 28, 29 of motion transmission elements may comprise an interengageable series of straight (rather than helical) splines and complementary pins, straight gear teeth, or other non-helical elements formed along the respective component surfaces of pretensioner 10. However, any system of complementary interengaging motion transmission elements used in the present invention should provide the desired rotational motion of spool 16 during sliding contact produced by motion of actuator 22. Thus, at least some of the motion transmission elements should have a helical configuration for producing relative rotation between the helical elements and the elements slidingly engaging the helical elements, during motion of actuator 22. For example, a first plurality 23, 25 of motion transmission elements may comprise one or more helical splines and one or more corresponding pins configured to engage the helical splines, while a second plurality 28, 29 of motion transmission elements comprises one or more straight splines and one or more corresponding pins configured to engage the straight splines.

In another alternative embodiment (not shown), prior to activation of the pretensioner, pins 29 projecting from actuator 22 are engaged with splines 28 spaced along base member 50, while pins 25 projecting from actuator 22 are separated by a gap (and are thus disengaged from) splines 23 along spool sidewall 16a. In this embodiment, engagement between splines 23 and pins 25 is induced by translational motion of base member 50 upon activation of the pretensioner.

In yet another alternative embodiment (not shown), prior to activation of the pretensioner, pins 29 projecting from actuator 22 are separated by a gap (and are thus disengaged from) splines 28 spaced along base member 50, while pins 25 projecting from actuator 22 are engaged with splines 23 along spool sidewall 16a. In this embodiment, engagement between splines 28 and pins 29 is induced by translational motion of base member 50 upon activation of the pretensioner.

Figure 2:
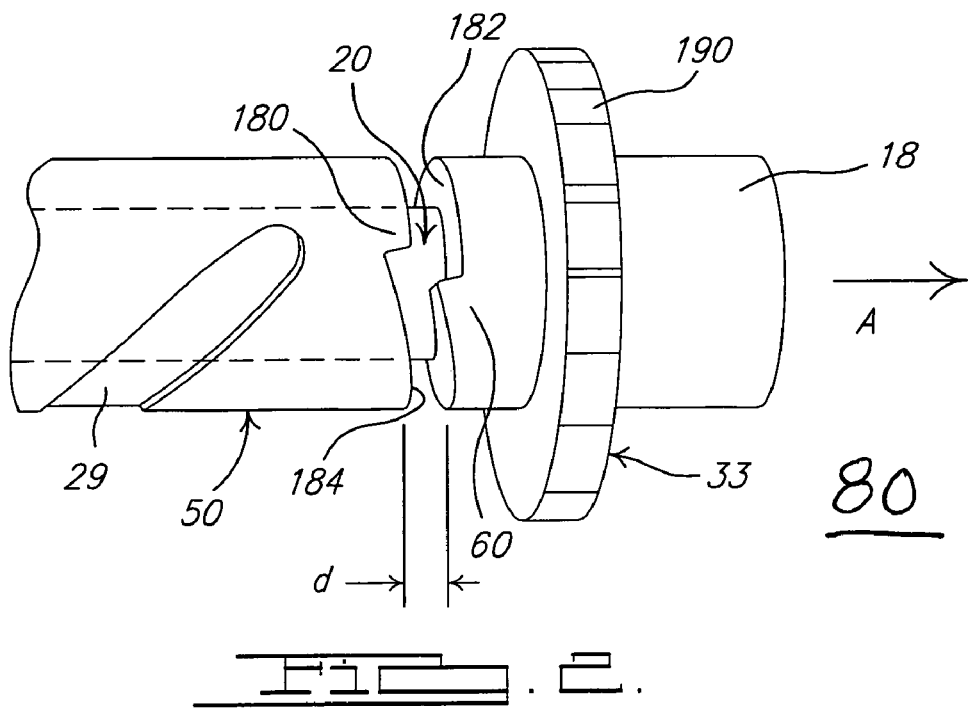
FIG. 2 is a perspective view of one embodiment of a coupling mechanism in accordance with the present invention.

Referring to FIGS. 1 and 2, a coupling mechanism, generally designated 80, is engageable upon movement of base member 50 in direction "A" for coupling base member 50 to stationary member 20 upon activation of the pretensioner mechanism. In the embodiment shown in FIGS. 1 and 2, the coupling mechanism comprises a plurality of teeth 60 formed along a shoulder 182 of stationary member 20, and another plurality of complementary teeth 180 formed along a shoulder 184 of base member 50 opposite stationary member teeth 60. Base member teeth 180 and stationary member teeth 60 are engageable upon movement of the base member in direction "A" for coupling base member 50 to stationary member 20, to substantially rotationally fix base member 50 with respect to spool 16. As seen in FIGS. 1 and 2, base member teeth 180 are axially spaced apart a distance "d" from stationary member teeth 60 during normal operation of the retractor (i.e., prior to activation of the pretensioner.)

Referring again to FIGS. 1 and 2a, base member teeth 180 and stationary member teeth 60 are also configured so that when base member teeth 180 are engaged with stationary member teeth 60 after pretensioner activation, the coupling mechanism permits rotation of base member 50 in a direction indicated by arrow "B". However, the coupling mechanism also rotationally constrains base member 50 so as to substantially prevent counter-rotation of the base member in a direction indicated by arrow "C", opposite direction "B", both during motion of actuator 22 in direction "A", and after the seatbelt has been pretensioned. The coupling mechanisms described herein assist in allowing the stationary member 20 to manage peak loads during seatbelt webbing payout.

In the first embodiment, motion of actuator 22 is produced by expanding gases resulting from combustion of a gas generant composition. Referring again to FIG. 1, an initiator assembly 14 is mounted to retractor frame 12 and comprises an igniter mount 17 and an igniter 15 secured within the igniter mount. A quantity of a gas generant composition (not shown) is positioned intermediate igniter 15 and gas flow apertures 35 leading into spool interior cavity 16d.

The gas generant is ignitable with igniter 15 when pretensioning of the associated seatbelt is desired. Gas generants useful in conjunction with the present invention are gas generants well known to those of ordinary skill in the art. For examples, see U.S. Pat. Nos. 5,035,757, 5,460,668, 5,756,929, and 5,872,329, each herein incorporated by reference. These compositions exemplify, but do not limit, useful gas generant compositions. In alternative embodiments, the gas generant composition may be positioned at other locations (for example, or inside initiator assembly 14.)

Igniter 15 is coupled to pretensioner mechanism 10 so as to enable fluid communication between the igniter and the gas generant composition upon activation of the pretensioner. In the embodiment shown in FIG. 1, igniter 15 is positioned proximate an end of passage 21 formed in stationary member shaft portion 20a. Igniter 15 may be any suitable igniter, one example of which is disclosed in U.S. Pat. No. 6,009,809. A particular type of igniter, known in the art as a micro-gas generator, suitable generally for relatively small occupant protection pyrotechnic charges, is most preferred. Igniter 15 preferably contains (or is positioned proximate) a relatively small pyrotechnic charge or booster material (not shown), many of which are known in the art. Igniter 15 may be coupled to the pretensioner mechanism in any one of several alternative ways. For example, igniter 15 may be positioned at the opposite side of actuator 22 from the presently disclosed design.

Operation of pretensioner mechanism 10 will now be discussed.

Figure 3:
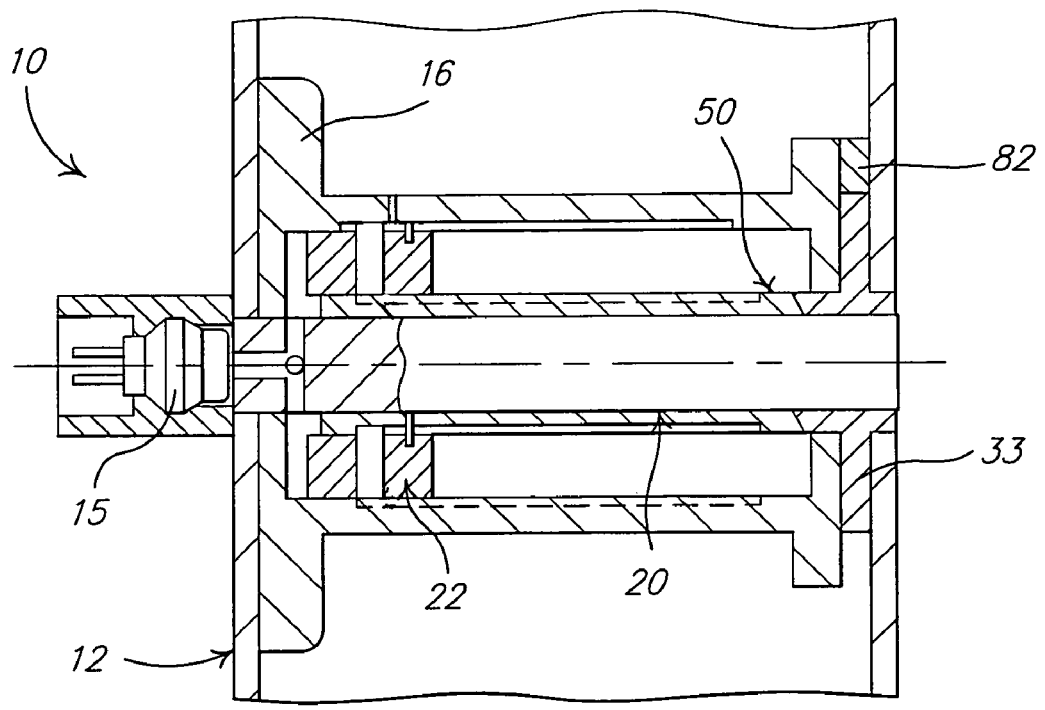
FIG. 3 is a cross-sectional side view of the pretensioner mechanism shown in FIG. 1 showing the pretensioner mechanism in a partially deployed state, shortly after activation.
Figure 4:
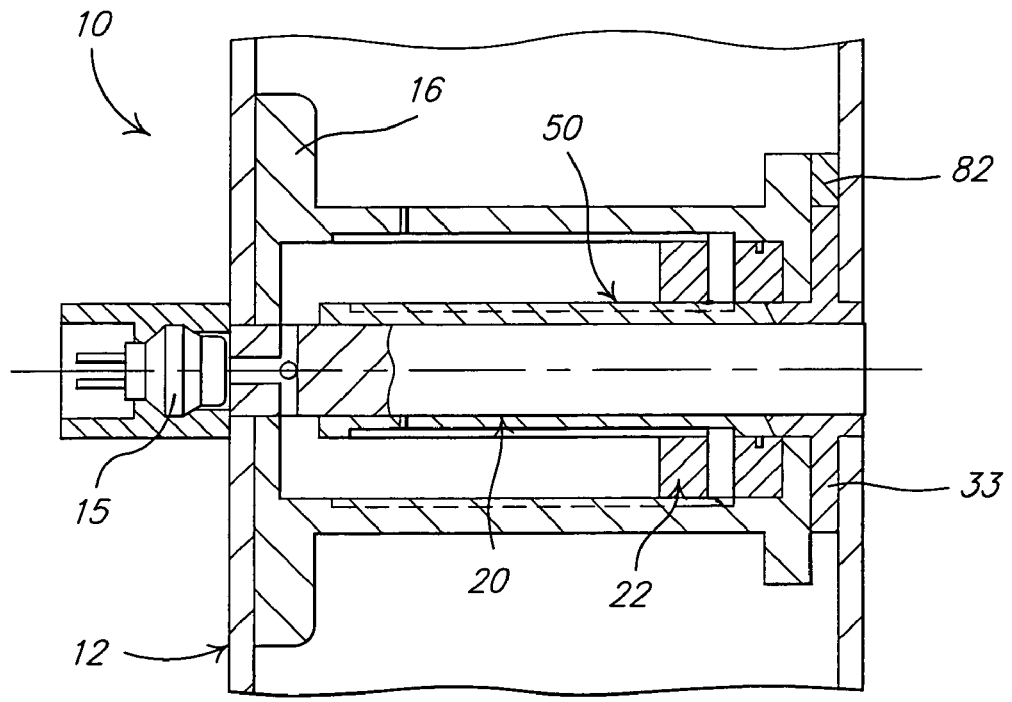
FIG. 4 is a cross-sectional side view of the pretensioner mechanism shown in FIG. 1 showing the pretensioner mechanism in a fully deployed state.

FIGS. 3 and 4 show actuator 22 in partially and fully deployed states, respectively. Referring to FIGS. 1-4, when pretensioner mechanism 10 is activated upon a crash event, a signal from a crash sensor (not shown) is conveyed to igniter 15, thereby activating the igniter and preferably igniting a booster charge positioned therein.

A flame front resulting from activation of the booster charge traverses passage 21, and preferably ignites the gas generant material positioned intermediate igniter 15 and gas flow apertures 35. Ignition of the gas generant preferably rapidly creates an expanding gas in shaft passage 21. The pressure in passage 21 thus increases relatively quickly, and expanding gases flow through flange apertures 35 to impinge upon pressure surface 37 of actuator 22, providing an axial driving force on actuator 22. This drives actuator 22 in the direction indicated by arrow "A".

As the axial force on actuator 22 drives the actuator in direction "A", shear pin 70 breaks, disengaging actuator 22 from spool 16. In addition, base member 50 (which is coupled to actuator 22 via shear pin 52) also moves in direction "A" until an end portion of base member 50 contacts stationary member 20 (see FIG. 2), thereby permitting base member teeth 180 to engage teeth 60 on stationary member 20. Shear pin 52 thus connects base member 50 to actuator 22 thereby moving base member teeth 180 into engagement with stationary member teeth 60 upon activation of the pretensioner. At this point, as base member 50 abuts stationary member 20, further motion base member in direction "A" is impeded. As actuator 22 continues to move in direction "A", shear pin 52 connecting actuator 22 and base member 50 breaks. As the axial force on actuator 22 drives the actuator in direction "A", pins 28 extending from actuator 22 slidingly engage splines 29 along base member 50, thereby producing a desired relative rotational motion of actuator 22. Simultaneously, pins 25 extending from actuator 22 slidingly engage splines 23 along spool 16, thereby producing a desired relative rotational motion of spool 16. Accordingly, the driving of actuator 22 axially within spool 16 will induce a rotation of spool 16, retracting the associated seatbelt.

As base member 50 is coupled to stationary member 20 via coupling mechanism 80 (thereby preventing rotation of base member 50 in direction "C" (FIG. 2*a*)), base member 50 does not rotate during translational motion of actuator 22, but serves as an anchor, or base, against which a reaction force is exerted by the engaging sets of splines to support relative rotation of the other pretensioner elements. In addition, engagement between base member teeth 180 and stationary member teeth 60 provides for one-way rotation of spool 16 (in the direction indicated by arrow "B" (FIG. 2)). Accordingly, rotation of base member 50 is substantially prevented in direction "C", yet allowed in the opposite direction (direction "B").

The relative helical curvatures of splines 25, 23 and/or splines 28, 29 can be adjusted to provide for relatively more or less rotation of spool 16 over a given time period, thus producing a more or less vigorous retraction of the seatbelt. In addition, the size of any gap separating pins 28 and splines 29 and/or the size of any gap separating pins 23 and splines 25 prior to pretensioner activation may be adjusted to control the distance traveled by actuator 22 prior to sliding engagement between the pins and splines. This may be used to control the amount of relative rotation of spool 16. Further, the quantity and types of gas generant placed in chamber 40 can be adjusted to provide for greater or lesser force driving actuator 22, thereby affecting the speed with which the seatbelt is pretensioned.

Referring to FIGS. 1 and 2*a*, either immediately prior to, during, or after activation of the pretensioner, a pawl 82 coupled to spool 16 is actuated to engage complementary teeth 190 on flange 33, which is coupled to stationary member 20. This substantially rotationally constrains spool 16 so as to substantially prevent rotation of the spool in direction "C", opposite direction "B" (in which the spool is wound to pretension the seatbelt.) Subsequently, a force exerted on the seatbelt will be transmitted from spool 16 to stationary member 20 via the engaged splines and the engaged teeth on base member 50 and stationary member 20, and also through pawl 82 and flange teeth 190. Shaft portion 20*a* may angularly deflect to absorb the applied force and will aid in load-limiting (i.e., controlling the maximum seatbelt force on the vehicle occupant) as the webbing pays out.

Pawl 82 is actuated to engage toothed wheel by a vehicle sensing and/or web sensing system incorporated into the retractor mechanism. Such actuation may be accomplished using any one of several known mechanisms. For example, U.S. Pat. Nos. 6,732,969 and 6,688,547, incorporated herein by reference, discloses a pawl actuation system adaptable to actuate pawl 82 to engage toothed wheel 190, in the manner previously described. Alternatively, other known mechanisms may be employed to actuate the pawl either immediately prior to, during, or after activation of the pretensioner.

It should be appreciated that the relative timing of the breaking of the shear pins is not critical, and moreover, the shear pins can be dispensed with altogether without departing from the scope of the present invention. Preferably, actuator 22 will induce base member 50 to move axially prior to breaking of the shear pin coupling them together, urging base member 50 into engagement with the coupling mechanism between the base member and stationary member 20, as described herein. FIG. 4 illustrates pretensioner 10 substantially as it would appear when fully deployed.

A helical (or other non-straight) configuration of motion transmission elements is needed to provide relative rotation between the components of the pretensioner. Thus in the embodiment shown in FIG. 1, where both sets of motion transmission elements have at least one element with a helical configuration, the rotation of spool 16 can be maximized due to the relative rotations imparted by two sets of helical elements, rather than one set of helical elements.

Figure 5:
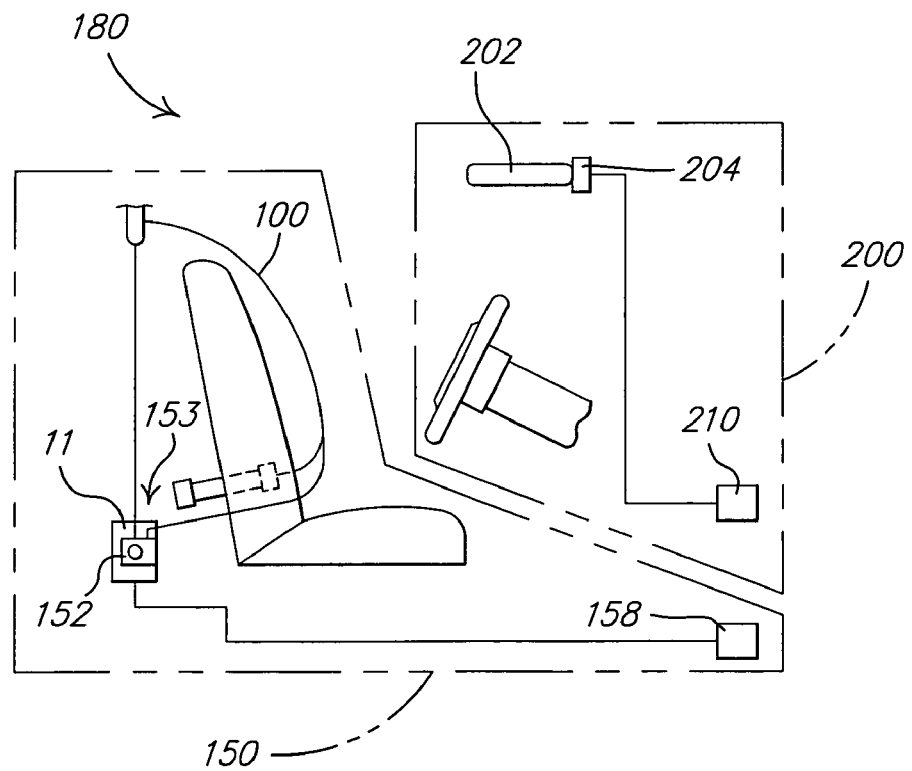
FIG. 5 is a schematic representation of an exemplary vehicle occupant restraint system incorporating a pretensioner mechanism in accordance with the present invention.

Any of the pretensioner embodiments described herein may also be incorporated into a vehicle occupant restraint system 180, as seen in FIG. 5. Vehicle occupant restraint system 180 may include a safety belt system, generally designated 150, having a safety belt housing 152 and a safety belt 100 extending from housing 152. A safety belt retractor 11 (for example, a spring-loaded mechanism) may be coupled to an end portion 153 of the belt. In addition, a safety belt pretensioner mechanism (not shown) in accordance with the present invention may be coupled to belt retractor 11 to actuate the retractor mechanism in the event of a collision. Typical seat belt retractor mechanisms which may be used in conjunction with the pretensioner mechanism embodiments of the present invention are described in U.S. Pat. Nos. 5,743,480, 5,553,803, 5,667,161, and 4,597,546, incorporated herein by reference.

Safety belt system 150 may be in operative communication with a crash event sensor 158 (for example, an inertia sensor or an accelerometer) communicating with a known crash sensor algorithm that signals actuation of the belt pretensioner via, for example, activation of an associated igniter (not shown). U.S. Pat. Nos. 6,505,790 and 6,419,177, previously incorporated herein by reference, provide illustrative examples of pretensioners actuated in such a manner.

Referring again to FIG. 5, restraint system 180 may also include additional elements such as an airbag system 200. FIG. 5 shows a schematic diagram of one exemplary embodiment of such a restraint system. Airbag system 200 includes at least one airbag 202 and an inflator 204 coupled to airbag 202 so as to enable fluid communication with an interior of the airbag. Inflator 204 contains a combustible gas generant composition (not shown) for generating inflation gas for inflating airbag 202, and at least one igniter (not shown) for igniting the gas generant composition in the inflator. Examples of inflators which may be incorporated into airbag system 200 are described in U.S. Pat. Nos. 6,752,421, 5,806,888, and 6,341,799, all incorporated herein by reference. Airbag system 200 may also be in operative communication with a crash event sensor 210 communicating with a known crash sensor algorithm that signals actuation of airbag system 200 via, for example, activation of airbag inflator 204 in the event of a collision.

It is contemplated that the present invention will find primary application in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A pretensioner mechanism for use with a seatbelt retractor comprising:
   a rotatable member configured for rotating in a first direction to wind a seatbelt webbing thereon;
   a movable member movable with respect to the rotatable member;
   first and second complementary motion transmission elements, the first motion transmission element being secured along a portion of the movable member, the second motion transmission element being secured along a portion of the rotatable member, the second motion transmission element being configured for sliding engagement with the first motion transmission element;

a base member movable translationally with respect to the rotatable member;

complementary third and fourth motion transmission elements, the third motion transmission element being secured along a portion of the base member, the fourth motion transmission element being secured along a portion of the movable member, the fourth motion transmission element being configured for sliding engagement with the third motion transmission element;

at least one of the motion transmission elements having a helical configuration for producing relative rotation between the at least one motion transmission element and a complementary motion transmission element thereof upon sliding engagement therebetween; and an engageable coupling mechanism for coupling the base member to a portion of the pretensioner mechanism that is substantially fixed with respect to the rotatable member, to substantially rotationally constrain the base member so as to substantially prevent rotation of the base member in a second direction opposite the first direction during sliding engagement between the third and fourth motion transmission elements.

2. The pretensioner mechanism of claim 1 wherein the coupling mechanism is engageable upon movement of the base member.

3. The pretensioner mechanism of claim 1 wherein the coupling mechanism is engageable upon activation of the pretensioner mechanism.

4. The pretensioner mechanism of claim 1 wherein the at least one of the motion transmission elements having a helical configuration is a helical groove.

5. The pretensioner mechanism of claim 1 wherein the motion transmission element complementary to the at least one of the motion transmission elements is a helical spline configured for sliding engagement with the helical groove.

6. The pretensioner mechanism of claim 1 wherein the movable member is detachably coupled to the rotatable member such that the movable member is movable in conjunction with the rotatable member.

7. The pretensioner mechanism of claim 1 wherein the base member is detachably coupled to the movable member such that the base member is movable in conjunction with the movable member.

8. The pretensioner mechanism of claim 1 wherein the coupling mechanism includes:
   a stationary member substantially rotationally fixed so as to substantially prevent rotation of the stationary member;
   a first coupling element coupled to one of the stationary member and the base member; and
   a second coupling element coupled to the other one of the stationary member and the base member, the second coupling element being configured to engage the first coupling element to substantially prevent rotation of the base member in the second direction.

9. The pretensioner mechanism of claim 1 further comprising another engageable coupling mechanism for coupling the rotatable member to a portion of the pretensioner mechanism that is substantially fixed with respect to the rotatable member, to substantially rotationally constrain the rotatable member so as to substantially prevent rotation of the rotatable member in a second direction opposite the first direction after pretensioning of the seatbelt.

10. The pretensioner mechanism of claim 1 wherein, after activation of the pretensioner mechanism, the base member moves translationally to engage the coupling mechanism.

11. The pretensioner mechanism of claim 1 wherein the base member is coupled to the movable member so as to move translationally in conjunction with the movable member prior to engagement between the base member and the substantially fixed portion of the pretensioner mechanism.

12. The pretensioner mechanism of claim 4 wherein the motion transmission element complementary to the at least one of the motion transmission elements is a pin configured for sliding engagement with the helical groove.

13. A pretensioner mechanism for use with a seatbelt retractor, the pretensioner mechanism comprising:
   a rotatable member configured for winding a seatbelt webbing thereon;
   a movable member coupled to the rotatable member, the movable member being movable with respect to the rotatable member; and
   motion conversion means for converting motion of the movable member into rotational motion of the rotatable member in a first direction, thereby pretensioning a seatbelt webbing wound on the rotatable member, wherein the motion conversion means includes a first plurality of motion transmission elements, a first one of the first plurality of motion transmission elements being secured along a portion of the movable member, a second one of the first plurality of motion transmission elements being secured along a portion of the rotatable member, the second one of the first plurality of motion transmission elements being configured for sliding engagement with the first one of the first plurality of motion transmission elements, at least one of the first and second ones of the first plurality of motion transmission elements having a helical configuration for producing relative rotation between the at least one of the first and second ones of the motion transmission elements and the other of the first and second ones of the motion transmission elements upon sliding engagement therebetween; and
   a base member coupled to the movable member such that a translational motion of the movable member produces a corresponding translational motion of the base member.

14. The pretensioner mechanism of claim 13 wherein the rotatable member is rotationally coupled to the movable member so as to rotate in conjunction with the movable member, the base member is substantially rotationally constrained so as to substantially prevent rotation of the base member in a second direction opposite the first direction during motion of the movable member, and wherein the motion conversion means comprises:
   a first plurality of complementary motion transmission elements, a first one of the first plurality of complementary motion transmission elements being secured along a portion of the movable member, a second one of the first plurality of complementary motion transmission elements being secured along a portion of the base member, the second one of the first plurality of motion transmission elements being configured for sliding engagement with the first one of the first plurality of motion transmission elements,
   at least one of the first and second ones of the first plurality of motion transmission elements having a helical configuration for producing relative rotation between the at least one of the first and second ones of the motion transmission elements and the other of the first and second ones of the motion transmission elements upon sliding engagement therebetween.

15. The pretensioner mechanism of claim 13 wherein the base member is substantially rotationally fixed with respect to the rotatable member so as to substantially prevent rotation of the base member with respect to the rotatable member, and the motion conversion means further comprises a second plurality of complementary motion transmission elements, a first one of the second plurality of complementary motion transmission elements being secured along a portion of the movable member, a second one of the second plurality of complementary motion transmission elements being secured along a portion of the base member, the second one of the second plurality of motion transmission elements being configured for sliding engagement with the first one of the second plurality of motion transmission elements.

16. The pretensioner mechanism of claim 13 wherein the motion conversion means comprises:
   a helical groove formed along a portion of one of the movable member and the rotatable member; and
   a pin secured along a portion of the other of the movable member and the rotatable member, the pin being configured for sliding engagement with the helical groove to produce relative rotation between the pin and the groove upon sliding engagement therebetween.

17. The pretensioner mechanism of claim 13 wherein the motion conversion means is configured to convert motion of the movable member into approximately 1.25 rotations of the rotatable member.

18. The pretensioner mechanism of claim 14 further comprising a stationary member substantially rotationally fixed with respect to the rotatable member so as to substantially prevent rotation of the stationary member with respect to the rotatable member; and
   wherein the base member is substantially rotationally constrained by a coupling means for coupling the base member to the stationary member.

19. A pretensioner mechanism for use with a seatbelt retractor comprising:
   a rotatable member configured for winding a seatbelt webbing thereon;
   a movable member coupled to the rotatable member, the movable member being movable with respect to the rotatable member; and
   motion conversion means for converting motion of the movable member into rotational motion of the rotatable member in a first direction, thereby pretensioning a seatbelt webbing wound on the rotatable member, wherein the motion conversion means includes a first plurality of motion transmission elements, a first one of the first plurality of motion transmission elements being secured alone a portion of the movable member, a second one of the first plurality of motion transmission elements being secured alone a portion of the rotatable member, the second one of the first plurality of motion transmission elements being configured for sliding engagement with the first one of the first plurality of motion transmission elements, at least one of the first and second ones of the first plurality of motion transmission elements having a helical configuration for producing relative rotation between the at least one of the first and second ones of the motion transmission elements and the other of the first and second ones of the motion transmission elements upon sliding engagement therebetween,
   wherein the rotatable member is rotationally coupled to the movable member so as to rotate in conjunction with the movable member, and wherein the motion conversion means includes:
   a base member substantially rotationally constrained so as to substantially prevent rotation of the base member in a second direction opposite the first direction during motion of the movable member; and
   a first plurality of complementary motion transmission elements, a first one of the first plurality of complementary motion transmission elements being secured along a portion of the movable member, a second one of the first plurality of complementary motion transmission elements being secured alone a portion of the base member, the second one of the first plurality of motion transmission elements being configured for sliding engagement with the first one of the first plurality of motion transmission elements,
   at least one of the first and second ones of the first plurality of motion transmission elements having a helical configuration for producing relative rotation between the at least one of the first and second ones of the motion transmission elements and the other of the first and second ones of the motion transmission elements upon sliding engagement therebetween, and
   wherein the movable member is rotationally coupled to the rotatable member by a second plurality of complementary motion transmission elements, a first one of the second plurality of complementary motion transmission elements being secured along a portion of the movable member, a second one of the second plurality of complementary motion transmission elements being secured along a portion of the rotatable member, the second motion transmission element of the second plurality being configured for sliding engagement with the first motion transmission element of the second plurality.

20. The pretensioner mechanism of claim 15 wherein at least one of the first and second motion transmission elements of the second plurality of motion transmission elements have a helical configuration for producing relative rotation between the at least one of the first and second motion transmission elements of the second plurality and the other of the first and second motion transmission elements of the second plurality upon sliding engagement therebetween.

21. A vehicle occupant restraint system comprising:
   a seatbelt;
   a belt retractor coupled to an end portion of the seatbelt, the retractor having a rotatable member configured for rotating in a first direction to wind a seatbelt webbing thereon;
   a pretensioner mechanism coupled to the belt retractor to tension the seatbelt in the event of a collision, the pretensioner mechanism including:
   a rotatable member;
   a movable member coupled to the rotatable member and movable with respect to the rotatable member;
   a slidably-mounted base member coupled to the movable member;
   a helical groove formed along a portion of one of the movable member and the rotatable member;
   a pin secured along a portion of the other of the movable member and the rotatable member, the pin being configured for sliding engagement with the helical groove to produce relative rotation between the movable member and the rotatable member, thereby pretensioning a seatbelt webbing wound on the rotatable member; and
   a coupling mechanism for coupling the rotatable member to a portion of the pretensioner mechanism that is substantially fixed with respect to the rotatable member, for substantially preventing rotation of the rotatable member in a second direction opposite the first direction.

* * * * *

UNITED STATES PATENT AND TRADEMARK OFFICE
CERTIFICATE OF CORRECTION

| | |
|---|---|
| PATENT NO. | : 7,424,986 B2 |
| APPLICATION NO. | : 11/054793 |
| DATED | : September 16, 2008 |
| INVENTOR(S) | : Stevens |

Page 1 of 1

It is certified that error appears in the above-identified patent and that said Letters Patent is hereby corrected as shown below:

Column 11; Claim 19; Line 48; delete "alone" and insert --along--

Column 11; Claim 19; Line 50; delete "alone" and insert --along--

Column 12; Claim 19; Line 8; delete "alone" and insert --along--

Signed and Sealed this

Twenty-fifth Day of November, 2008

JON W. DUDAS
*Director of the United States Patent and Trademark Office*